United States Patent [19]  [11] 4,251,505
Steiner et al.  [45] Feb. 17, 1981

[54] PROCESS FOR CARRYING OUT GAS/LIQUID REACTIONS

[75] Inventors: Rudolf Steiner, Sulzbach; Peter Herbrechtsmeier, Hofheim am Taunus, both of Fed. Rep. of Germany

[73] Assignee: Hoechst Aktiengesellschaft, Frankfurt, Fed. Rep. of Germany

[21] Appl. No.: 60,962

[22] Filed: Jul. 26, 1979

[30] Foreign Application Priority Data

Jul. 28, 1978 [DE] Fed. Rep. of Germany ....... 2833190

[51] Int. Cl.³ .................. B01J 10/00; B01D 53/34
[52] U.S. Cl. .................................. 423/659; 423/240; 423/394; 55/68; 261/DIG. 75
[58] Field of Search ............... 423/659, 210 R, 393, 423/394, 240; 261/DIG. 75, 122; 55/68

[56] References Cited

U.S. PATENT DOCUMENTS 2,747,962  5/1956  Heitz et al. .................. 423/234
3,472,620  10/1969  Riga .............................. 423/393
4,104,364  8/1978  Hildebrandt .................. 423/481

FOREIGN PATENT DOCUMENTS 1957160  1/1971  Fed. Rep. of Germany .

OTHER PUBLICATIONS

Ralston, "The Ferric Sulphate-Sulphuric Acid Process," and Maier, Producing Small Bubbles of Gas in Liquids by Submerged Orifices, Bureau of Mines Bulletin 260, 1927, 122 pages, pp. 3, 6-9, 38-40 & 98-101.

Primary Examiner—Earl C. Thomas
Attorney, Agent, or Firm—Curtis, Morris & Safford

[57] ABSTRACT

Gas/liquid reactions are carried out in a downstream reactor in which the gas having a bubble diameter of 0.1 to 4 mm is injected into the liquid flowing downward at an empty tube velocity of 0.14 m/s to 0.5 m/s. The proportion by volume of liquid to gas should be greater than 8:1 and the residence time of the gas at least 6 second per meter of reactor length.

5 Claims, No Drawings

PROCESS FOR CARRYING OUT GAS/LIQUID REACTIONS

This invention relates to a process for carrying out gas/liquid reactions in downstream reactors with large gas/liquid proportions by volume.

Gas/liquid reactors often used in industry include bubble columns which are distinguished by an especially simple construction. In a reaction of this type, the gas is distributed in the liquid in the form of bubbles with the aid of aerating means, such as sinter plates or nozzles. By conducting the gas/liquid mixture in downward direction, the residence time can be prolonged. For this purpose, the gas is introduced at the head of the reactor column and by the flow of the liquid it is drafted towards the bottom together with the liquid. With the known mode of downward drafting of the gas/liquid mixture, the utilization of the gas is often insufficient so that the gas or the liquid must be recycled to the head of the column. For recirculation, either an external circuit is used or the respective components are passed through an internal loop, for example as proposed in DE-AS No. 1,957,160. For gassing, the liquid is generally passed at a high speed over the gas inlet openings.

It is the objective of the present invention to gas or aerate the downward flowing liquid under such conditions that the gas has reacted to the technologically desired extent with a single passage through the reactor.

The invention, therefore, provides a process for carrying out gas/liquid reactions in downstream reactors, which comprises injecting gas having a bubble diameter of from 0.1 to 4 mm, at most, however, 10 mm, into a liquid flowing in the downward direction at an empty tube speed of 0.14 m/s to 0.5 m/s, especially 0.2 to 0.5 m/s, the proportion by volume of liquid to gas being greater than 8:1 and the residence time of the gas being at least 6 seconds per meter of reactor length.

The main advantage achieved by the process of the invention is the uniform distribution of the gas over the cross sectional area of the column with low liquid velocities. In this manner, reductions of the cross sectional area which result in a much faster flow of the liquid and require more energy are unnecessary. A further advantage of the aeration of a large flow cross section according to the invention is that at the point of gas supply, the flow of the liquid is slow and, therefore, the residence time of the gas is rather long.

The following examples illustrate the invention.

EXAMPLE 1

The efficiency of the process according to the invention is demonstrated by the hydrolysis of phosgene. The reactor used consisted of a glass column having an internal diameter of 150 mm and a length of 2,000 mm. The column was immersed in a container serving as gas/liquid separator. The gas was distributed in water at the head of the reactor over 4 frits in radial position. The gas/liquid mixture containing 22% by volume of gas was conveyed downward to the reactor outlet. The introduced gas consisted of 108 l/hr of $COCl_2$ and 322 l/hr of air under normal conditions. The gas bubbles had a diameter in the range of from 4 to 6 mm. The empty tube speed of the liquid was 23 cm/sec. The proportion by volume of liquid to gas was 34:1 and the mean residence time of the gas was 25 seconds per meter of reactor length. In the gas space of the gas/liquid separator, an absolute pressure of 1.2 bar prevailed. The water has a temperature of 23° C. The inlet concentration of phosgene in air of 25% by volume could be reduced to a final concentration of less than 0.1 ppm at the reactor outlet. A recirculation of the gas and the liquid to the head of the column could be dispensed with.

EXAMPLE 2

To illustrate the good gas distribution and the resulting high degree of gas utilization by the process of the invention, the absorption of nitrous gases in water was determined under comparable conditions in a downstream reactor having a nominal width of 30 mm and a second downstream reactor with a nominal width of 150 mm. The reactor columns consisted of glass tubes having a length of 2,000 mm, each provided with 4 sinter plates at the side of the head, the outer edges of which were flush with the inner reactor wall so that no aeration element projected into the reactor and the cross section was not diminished. Each reactor column was immersed in a container mounted at the lower end to serve as gas/liquid separator. The degassed liquid was recirculated to the reactor head with the aid of a pump.

| Test conditions | |
| --- | --- |
| volume through flow, calculated on the free cross section of the downstream column | |
| gaseous phase | 0.44 cc/cm$^2$ s under normal conditions |
| liquid phase (tap water) 22 | cc/cm$^2$ s |
| size of bubbles | 2 to 6 mm |
| proportion by volume (liquid:gas) | about 50:1 |
| mean residence time of gas | about 40 seconds per meter of reactor length |
| absolute pressure in the gas space of immersion tank | 1.2 bar |
| liquid temperature | 27° C. |
| $NO_x$ inlet concentration in air | 10.7 % by volume |
| $NO_x$ outlet concentration | |
| nominal width 30 mm | 1,500 ppm |
| nominal width 150 mm | 1,500 ppm (accuracy of measurement in Dräger tube) |

This example shows that in using a reactor cross sectional area which was larger by a factor of 25, the absorption of nitrous gases in water by the process of the invention is effective and unchanged.

What is claimed is:

1. A process for carrying out gas/liquid reactions in a downstream reactor to improve the volume of gas utilized in the reactor, comprising
   injecting a gas having a bubble diameter of from 0.1 to 10 mm into a liquid flowing in a downward direction at an empty tube speed of 0.14 to 0.5 m/s, the proportion of said liquid to said gas being greater than 8:1 and the residence time of the gas being at least 6 seconds per meter of reactor length.

2. A process for carrying out gas/liquid reactions in a downstream reactor comprising
   injecting a gas to uniformly distribute a gas in a liquid over the cross sectional area at a head of the reactor to form a gas/liquid mixture, the proportion of said liquid to said gas being greater than 8:1 and the gas having a bubble diameter of from 0.1 to 10 mm;
   conveying the gas/liquid mixture downward in the reactor to a reactor outlet at an empty tube speed of 0.14 to 0.5 m/s, the residence time of the gas in the liquid being at least 6 seconds per meter of reactor length.

3. The process of claim 1 or 2, wherein the empty tube speed is from 0.2 m/s to 0.5 ms.

4. The process of claim 1 or 2, wherein the gas has a bubble diameter of from 0.1 to 4 mm.

5. The process of claim 1 or 2, wherein the gas includes phosgene and the liquid is water.

* * * * *